US006568707B2

(12) United States Patent
Hier et al.

(10) Patent No.: US 6,568,707 B2
(45) Date of Patent: May 27, 2003

(54) MOLDED SEAMLESS VEHICLE INTERIOR PANEL FOR CONCEALING AN AIRBAG

(75) Inventors: Michael J. Hier, Royal Oak, MI (US); Joseph Davis, Jr., Ortinville, MI (US); Jack Palazzolo, Dearborn, MI (US); John Faarup, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/791,366

(22) Filed: Feb. 23, 2001

(65) Prior Publication Data
US 2002/0117834 A1 Aug. 29, 2002

(51) Int. Cl.[7] .............................................. B60R 21/16
(52) U.S. Cl. ...................... 280/732; 280/728.3; 264/255
(58) Field of Search ................................. 264/255, 250, 264/138; 280/728.3, 732

(56) References Cited

U.S. PATENT DOCUMENTS

| 3,756,617 | A | | 9/1973 | Brown | |
|---|---|---|---|---|---|
| 4,973,081 | A | * | 11/1990 | Rafferty | 280/728.3 |
| 5,082,310 | A | | 1/1992 | Bauer | |
| 5,110,647 | A | | 5/1992 | Sawada et al. | |
| 5,154,444 | A | | 10/1992 | Nelson | |
| 5,222,760 | A | | 6/1993 | Rafferty | |
| 5,280,947 | A | * | 1/1994 | Cooper | 280/728.3 |
| 5,288,103 | A | | 2/1994 | Parker et al. | |
| 5,335,935 | A | | 8/1994 | Proos et al. | |
| 5,458,361 | A | * | 10/1995 | Gajewski | 264/242 |
| 5,484,273 | A | * | 1/1996 | Parker et al. | 425/112 |
| 5,487,557 | A | | 1/1996 | Eckhout | |
| 5,527,574 | A | | 6/1996 | Iannazzi et al. | |
| 5,536,037 | A | | 7/1996 | Cherry | |
| 5,580,083 | A | | 12/1996 | Parker | |
| 5,865,461 | A | * | 2/1999 | Totani et al. | 280/728.3 |
| 5,947,511 | A | | 9/1999 | Usui et al. | |
| 6,042,139 | A | * | 3/2000 | Knox | 280/728.3 |
| 6,129,378 | A | * | 10/2000 | Goto et al. | 280/728.3 |
| 6,168,188 | B1 | * | 1/2001 | Preisler et al. | 280/728.3 |
| 6,338,499 | B2 | * | 1/2002 | Ueno et al. | 280/728.2 |

OTHER PUBLICATIONS

Modern Plastics—A publication of the McGraw–Hill Companies; "Two–Platen Machines Are Adding Performance . . . "; Jun. 1997—pp. 1–2; 90, 91 & 93.

* cited by examiner

Primary Examiner—Paul N. Dickson
Assistant Examiner—Ruth Ilan
(74) Attorney, Agent, or Firm—Brooks & Kushman P.C.

(57) ABSTRACT

The present invention involves a molded seamless vehicle interior panel having a seamless airbag door for concealing an airbag. The panel includes a retainer portion and a door portion circumscribed by the retainer portion. The retainer portion is disposed adjacent the airbag of the vehicle and has an opening to define a void over the airbag. The retainer portion has an appearance finish of an aesthetic look. The door portion disposed within the void integrally circumscribed by the retainer portion to define the seamless airbag door through which the airbag may deploy. The door portion has an appearance finish compatible to the appearance of the retainer portion such that no seam is visible. The door portion is molded together with the retainer portion and formed of a material different than the material of the retainer portion.

16 Claims, 4 Drawing Sheets

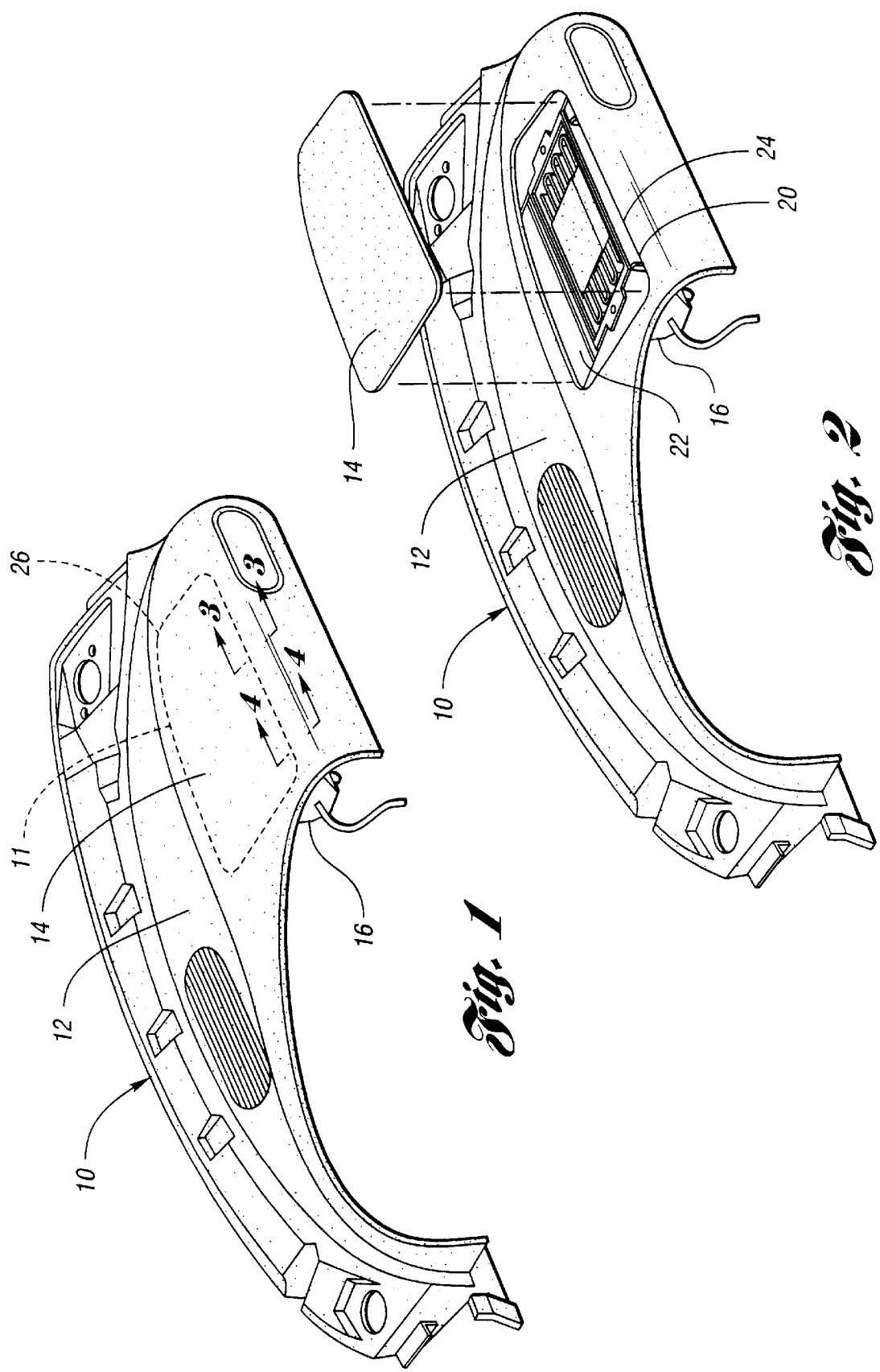

MOLDED SEAMLESS VEHICLE INTERIOR PANEL FOR CONCEALING AN AIRBAG

BACKGROUND OF THE INVENTION

1. Field of the Invention

The present invention relates to vehicle seamless interior panels for concealing and deploying an airbag.

2. Background Art

Airbags are widely known throughout the vehicle industry. Currently, a number of designs exist in which airbags are configured for deployment in vehicle compartments. Deployment of airbags through interior panels of a vehicle is also widely known. An airbag for an occupant in a passenger compartment of a vehicle is typically designed to deploy through a front interior panel of the vehicle. Typically, a hinged portion or a door portion of an interior panel allows an airbag to deploy therethrough during an impact of the vehicle, providing support and cushion to the occupant.

However, designers of interior panels and airbags have been challenged with providing effective deployment of an airbag while providing a pleasing aesthetic appearance on an interior panel through which the airbag may deploy. Designers of interior panels have also been challenged to provide such interior panels in a cost effective manner. An interior panel may generally have a retainer portion and a door portion through which an airbag may deploy. In several designs, the retainer portion circumscribes the door portion which comprises a substantial portion of the panel. In these designs, the interior panel has a visible seam having low resistance to normal or shear stress to allow deployment of an airbag therethrough. This seam clearly distinguishes the door portion from the retainer portion of the panel. Manufacturers of interior panels have met the challenge with limited success in providing an interior panel as described above with a non-visible seam.

SUMMARY OF THE INVENTION

Thus, it is an object of the present invention to provide a cost effective interior panel as described above having a non-visible seam, and a method of manufacturing such a panel.

It is an object of the present invention to provide a vehicle seamless interior panel for concealing an airbag. The panel comprises a first panel portion and a second panel portion. The first panel portion is adapted to lay sufficiently adjacent to the airbag to form a door through which the airbag may deploy. The first panel portion has an appearance finish. The second panel portion integrally circumscribes the first panel portion to form a retainer of the panel. The second panel portion has an appearance finish compatible to the appearance finish of the first panel portion such that no seam is visible. The first panel portion is molded together with the second panel portion. The first panel portion is formed of a material different than the material of the second panel portion.

In another embodiment of the present invention a vehicle door panel has a seamless airbag door for deploying an airbag. The panel comprises a retainer portion and a door portion. The retainer portion is disposed adjacent the airbag and has an opening to define a void over the airbag. The retainer portion has an appearance finish. The door portion is disposed within the void integrally circumscribed by the retainer portion to define the seamless airbag door through which the airbag deploys. The door portion has an appearance finish compatible to the appearance finish of the retainer portion such that no seam is visible. The door portion is molded together with the retainer portion and is formed of a material different than the material of the retainer portion.

It is another object of the present invention to provide a method of making a vehicle seamless panel for concealing an airbag. The method includes providing a first mold member and a second mold member having a first portion and a second portion. The first mold member and the first portion cooperates to define a first closed mold cavity configured to form a retainer portion of the panel to be disposed adjacent the airbag. The retainer portion has an opening to define a void over the airbag. The first mold member and the second portion cooperates to define a second closed mold cavity configured to hold the molded retainer portion and to form a door portion of the panel to be disposed within the void. The door portion is integrally circumscribed by the retainer portion. The method further includes moving the first portion into contact with the first mold member to cooperate with the first mold member to form the first closed mold cavity and injecting a first material into the first closed mold cavity to form the retainer portion of the panel. The method further includes moving the second portion into contact with the first mold member to cooperate with the first mold member to form the second closed mold cavity and injecting a second material into the second closed mold cavity to form the door portion of the panel.

It is an object of the present invention to provide another method of making a vehicle seamless panel for concealing an airbag. The method provides a first mold member and a second mold member wherein the second mold member has a movable part operative to selectively vary the configuration of a mold cavity formed by the first and second mold member when the part is moved between first and second position. The first mold member cooperates with the second mold member with the movable part in the first position to define a first closed mold cavity configured to form a retainer portion of the panel to be disposed adjacent the airbag. The retainer portion has an opening to define a void over the airbag. The first mold member cooperates with the second mold member when the part is placed in the second position to define a second closed mold cavity configured to hold the molded retainer portion and to form a door portion of the panel to be disposed within the opening integrally circumscribed by the retainer portion. The method further comprises placing the part of the second mold member in the first position to cooperate with the first mold member to provide the first closed mold cavity and injecting the first material into the first closed mold cavity to form the retainer portion of the panel. The method further includes moving the part of the second mold member to the second position to cooperate with the first mold member to provide the second mold cavity and injecting a second material into the second closed mold cavity to form the door portion of the panel.

The above objects and other objects, features, and advantages of the present invention are readily apparent from the following detailed description when taken in connection with the accompanying drawings.

BRIEF DESCRIPTION OF THE DRAWINGS

FIG. 1 is a perspective view of a vehicle seamless interior panel for concealing an airbag in accordance with the present invention;

FIG. 2 is an exploded perspective view of the seamless interior panel of FIG. 1;

DETAILED DESCRIPTION OF THE PREFERRED EMBODIMENT(S)

Figure 3:
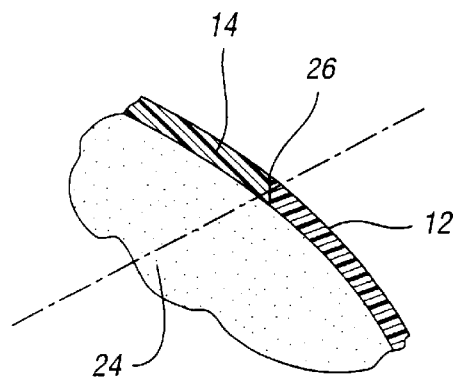
FIG. 3 is a cross-sectional view of the interior panel taken along lines 3—3 of FIG. 1.

FIG. 1 illustrates vehicle seamless interior panel 10 having a seamless airbag door 11 for concealing airbag 16. In this embodiment, airbag 16 is designed but not limited to deploy for an occupant in a vehicle's passenger compartment. The panel 10 has retainer portion 12 and door portion 14 integrally molded to retainer portion 12. As shown in FIGS. 1 and 2, retainer portion 12 is disposed adjacent airbag 16 and has opening 20 formed therethrough to define void 22 over airbag 16. Retainer portion 12 has an appearance finish of a desired aesthetic look. As shown, door portion 14 is disposed within void 22 to define the seamless airbag door through which airbag 16 may deploy. Door portion 14 has an appearance finish which is compatible to the appearance finish of the retainer portion such that no seam is visible on either side of the panel. As described in greater detail below, door portion 14 is molded to retainer portion 12 with compatible materials such that another step of creating a notch or a seam, which would otherwise be visible, is no longer necessary. Door portion 14 is molded together with retainer portion 12 and is adapted to lay sufficiently over airbag 16 to form the airbag door. Retainer portion 12 integrally circumscribes or surrounds the door portion to form a remainder or retainer of the panel. As shown, the retainer may include an entire front interior panel without the airbag door. As shown in FIGS. 2–3, retainer portion 12 has a perimeter 24 about which door portion 14 is circumscribed or surrounded to form the door through which airbag 16 may deploy. As shown, perimeter 24 defines an interface 26 between door and retainer portions wherein interface 26 has a low resistance threshold to stress such that retainer and door portions 12, 14 separate when airbag 16 is deployed.

As mentioned above, it is preferred that the material of the retainer portion be compatible with the material of the door portion such that the interface at which the portions contact provides sufficient bonding therebetween for a seamless appearance on either side of the panel, yet provides a low resistance to normal and shear stress. Sufficient bonding allows door portion 14 to be attached to retainer portion 12 without distinct separation of the portions during normal use of the vehicle. The low resistance to stress allows the airbag to be deployed through the perimeter 24 between the door portion and the retainer portion of the panel.

Door portion 14 is formed of a material different than the material of the retainer portion 12. Preferably, the retainer portion is of a more rigid material than the material of the door portion. For example, the material comprising the retainer portion may be a rigid material such as polycarbonate resin containing acrylonitrile, butadiene, and styrene (PC-ABS) material, Thermoplastic elatomer ethareter (TEEE), or polypropylene. The material comprising the door portion is less rigid than the material of the retainer portion such as, the product having the trade name Santoprene™ supplied by Monsanto Co., a thermoplastic polyolefinic (TPO) material, or a copolyester elastomer such as the products having the trade name DYM of E.I. duPont de Numours and Company. The material comprising a skin (described below) may be TPO. Preferably, the materials used for the door and retainer portions are compatible to allow the portions to bond together.

Figure 4:
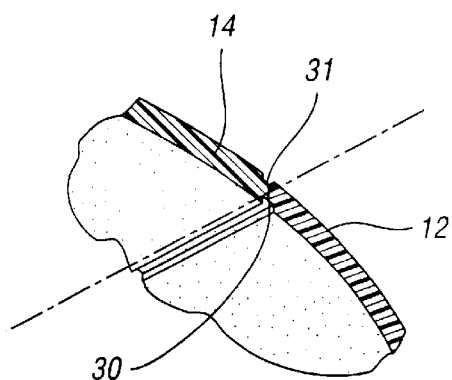
FIG. 4 is cross sectional view of another embodiment of the present invention depicting notches and grooves formed on an interior panel.
Figure 5:
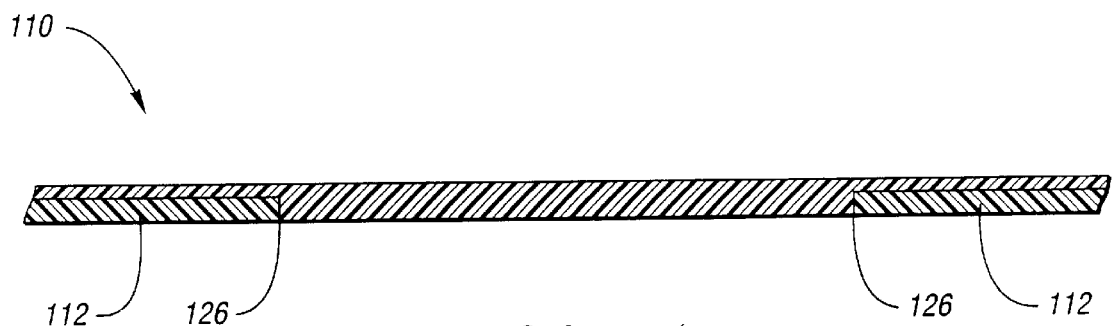
FIG. 5 is a cross sectional view of yet another embodiment of the present invention depicting a door portion of an interior panel.
Figure 6:
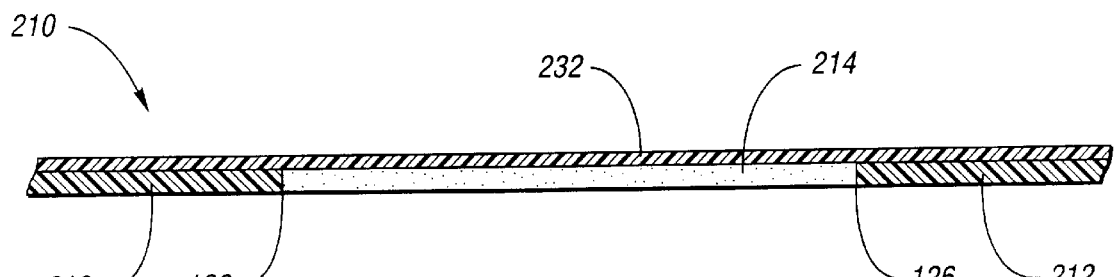
FIG. 6 is a cross sectional view of yet another embodiment of the present invention depicting a skin disposed on a door portion and a retainer portion of an interior panel.

As shown in FIG. 4, in one embodiment, notch 30 may be formed on the interface adjacent the airbag to further lower the resistance threshold to stress or pressure. Moreover, interface 26 may also include groove 31 formed thereon opposite airbag 16 to further lower the resistance threshold to stress. FIG. 5 illustrates a cross-sectional view of another embodiment of the present invention wherein door portion 114 extends away from an airbag opening and transverse retainer portion 112. In this embodiment, door portion 114 substantially entirely covers retainer portion 112 such that a show surface of interior panel 110 shows only the material of door portion 114. In yet another embodiment in FIG. 6, top portion or skin 232 may cover both retainer portion 212 and door portion 214 to provide an even more aesthetically different show surface of interior panel 210.

It is to be noted that, although a front interior panel is shown in FIGS. 1 and 2, interior side panels and interior pillars may also include the present invention.

Figure 7:
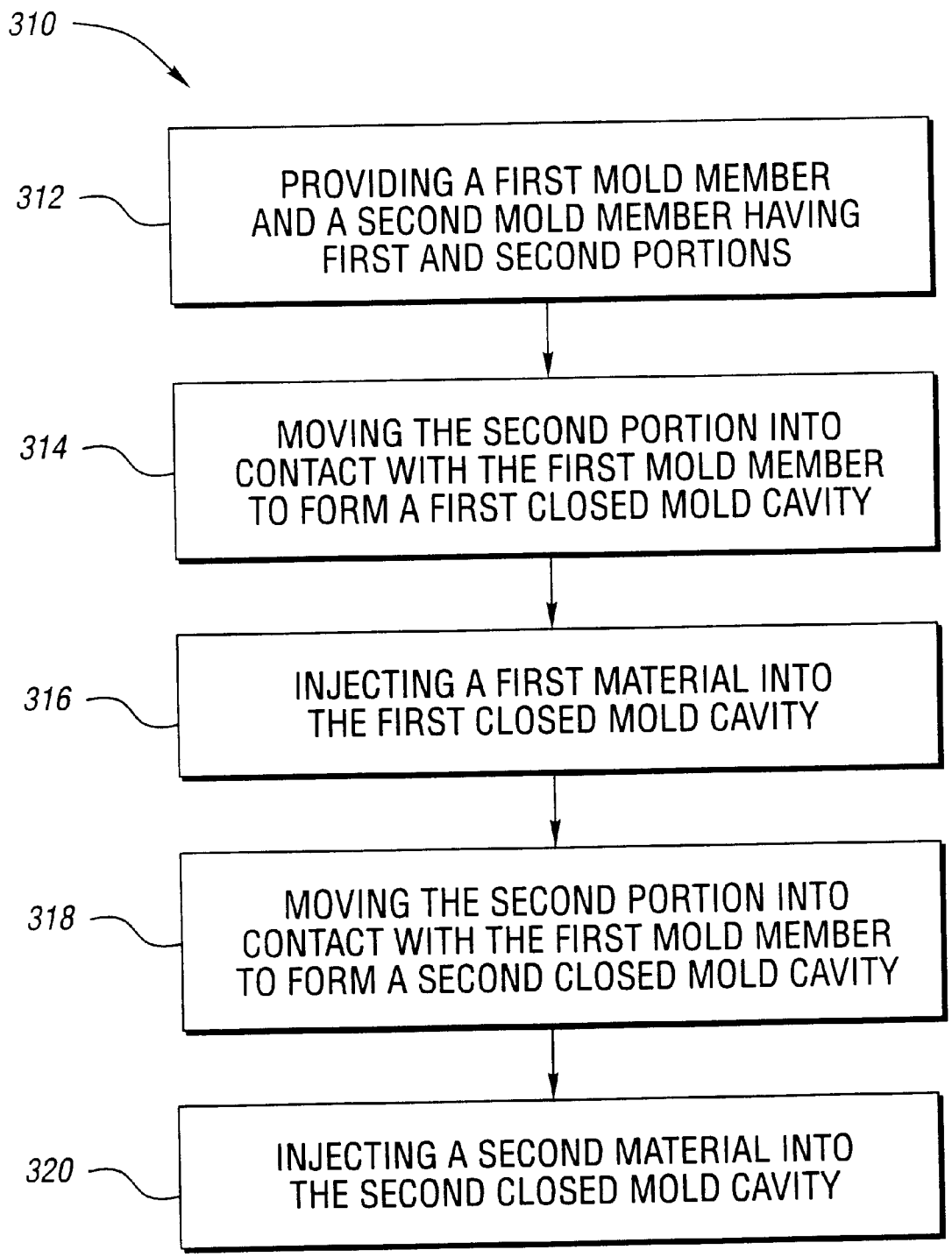
FIG. 7 is a flow chart of one method of making a vehicle seamless panel for concealing an airbag in accordance with the present invention.

The retainer and door portions 12, 14 may be bonded together by various means. For example, as shown in FIG. 7, in a two-shot molding process of making a vehicle seamless panel for concealing an airbag, method 310 includes providing a first mold member and a second mold member having a first portion and a second portion in block 312. The first mold member may be a non-rotating mold half and the second mold member may be a rotating mold half having a first core and a second core. The non-rotating mold half and the first core cooperate to define a first closed mold cavity which is configured to form a retainer portion of the panel to be disposed adjacent the airbag. The retainer portion 12, as described above, has an opening to define a void over the airbag. The non-rotating member and the second core cooperate to define a second closed mold cavity which is configured to hold the molded retainer portion and to form a door portion of the panel to be disposed within the void. When molded, the door is integrally circumscribed by the retainer portion 12. As shown in block 314, the method further includes moving or rotating the first core into contact with the non-rotatable member to cooperate with the non-rotatable member to form the first closed mold cavity. Then, a first material, as described above, is injected into the first closed mold cavity to form the retainer portion 12 of the panel as shown in block 316. The first material is held in the first closed mold cavity for about 10–30 seconds. Then, as shown in box 318, the method includes moving the first core from the non-rotating member and moving or rotating the second core into contact with the non-rotating member to cooperate with the rotating member to form the second closed mold cavity. Then, a second material, as described above, is injected into the second closed mold cavity to form the door portion 14 of the panel as shown in box 320. The second material in the second closed mold cavity is held for about 0.5–2.0 minutes. Then, the second core is moved from the non-rotatable member.

Figure 8:
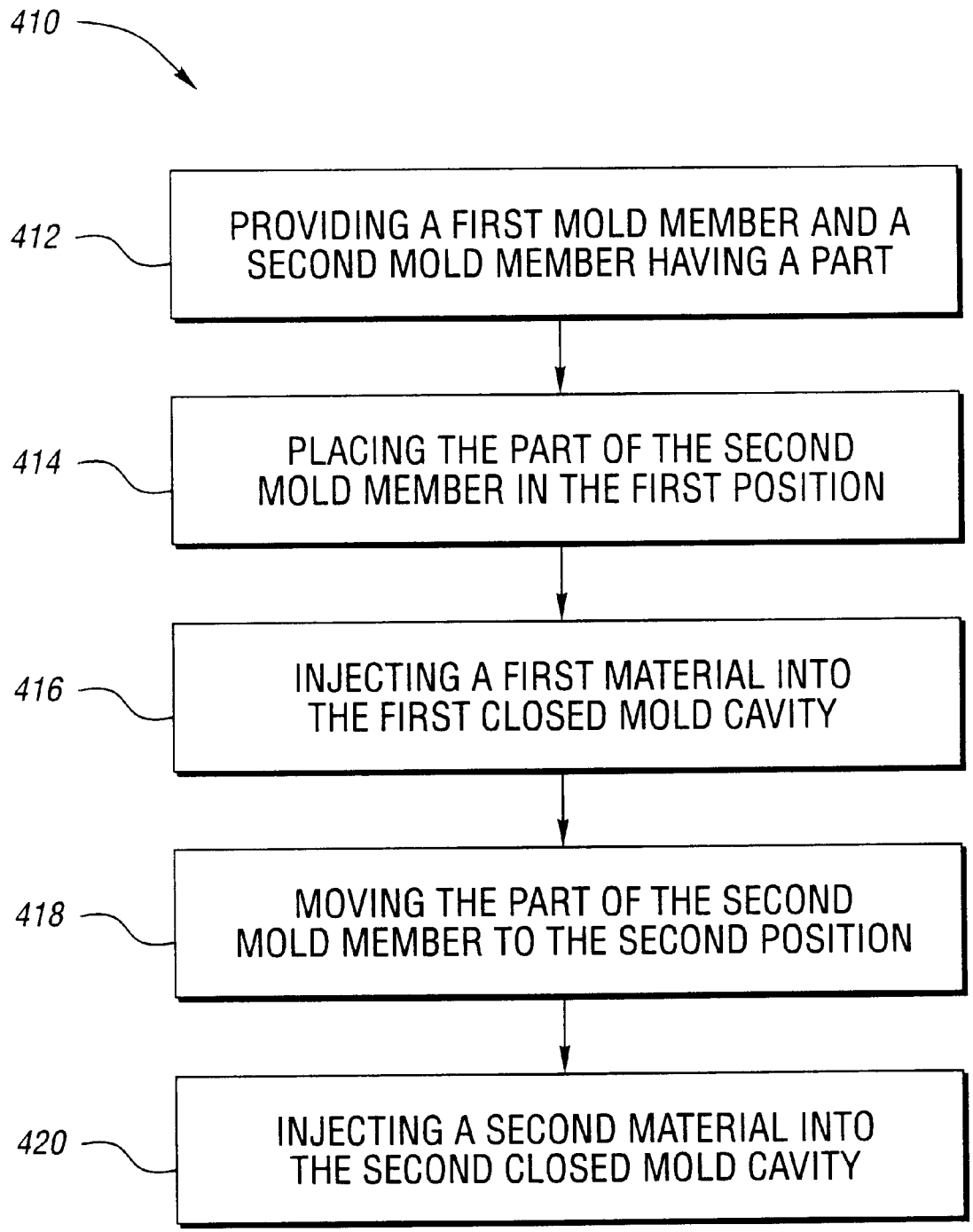
FIG. 8 is a flow chart of another method of making a vehicle seamless panel for concealing an airbag in accordance with the present invention.

In another example illustrated in FIG. 8, a conventional sliding core molding technology may be used. As shown, method 410 includes providing a first mold member and a second mold member. The second mold member has a movable part operative to selectively vary the configuration of a mold cavity formed by the first and second mold members when the part is moved between first and second positions. The first mold member cooperates with the second mold member with the movable part in the first position to define a first closed mold cavity in block 412. The term "part" refers to a movable part of a mold which forms part of a mold cavity for varying the configuration of the mold cavity, such as with a lifter or slide. The method 410 of the present invention involves moving or sliding the part into a position rather than rotating a mold half as previously described. The first closed mold cavity is configured to form a retainer portion of the panel to be disposed adjacent the airbag. As stated above, the retainer portion 12 has an opening to define a void over the airbag. Next, the part is placed in the second position such that the first mold member cooperates with the second mold member to define a second closed mold cavity. The second closed mold cavity is configured to hold the molded retainer portion and to form a door portion of the panel to be disposed within the opening. Thus, the part may be located on the second mold member proximate the portion of the mold cavity corresponding with the opening of molded retainer portion 12 wherein the part is movable to form the door portion 14. The door portion 14 is integrally circumscribed by the retainer portion 12. As shown in block 414, the method further includes moving or sliding the part of the second mold member to the first position to cooperate with the first mold member to provide the first closed mold cavity. Next a first material is injected into the first closed mold cavity to form the retainer portion 12 of the panel as shown in block 416. The first material in the first closed mold cavity is set for about 10–30 seconds there within. Then, as shown in block 418, the part of the second mold member is moved to the second position to cooperate with the first mold member to provide the second mold cavity. Then, a second material is injected into the second closed mold cavity to form the door portion 14 of the panel in block 420. The second material in the second closed mold cavity is allowed to set for about 0.5–2.0 minutes therewithin.

It is to be noted that other processes may be used to bond the retainer and door portions together. For example, other processes may include insert molding and razing blade processes which would not depart beyond the scope and spirit of the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seamless interior panel for concealing an airbag, the panel comprising:
    a first panel portion adapted to lay sufficiently adjacent to the airbag to form a door covering an opening through which the airbag may deploy, the first panel portion having an appearance finish; and
    a second panel portion integrally circumscribing the first panel portion and having an appearance finish substantially similar to the appearance finish of the first panel portion such that no seam is visible between the first and second panel portions; with
    the first panel portion being molded together with the second panel portion and formed of a material different than the material of the second panel portion, with the second panel portion having a perimeter about which the first panel portion is circumscribed to form the door, the perimeter defining an interface between the first and second panel portions, the interface having a low resistance threshold to pressure such that the first and second panel portions separate when the air bag is deployed, and with the first panel portion extending over the second panel portion.

2. The vehicle interior panel of claim 1 further comprising a top portion disposed over the first and second panel portions.

3. The vehicle interior panel of claim 1 wherein the first panel portion comprises a first material and the second portion panel comprises a second material.

4. The vehicle interior panel of claim 3 wherein the first material is more rigid than the second material.

5. The vehicle interior panel of claim 1 wherein the interface defines the opening.

6. The vehicle interior panel of claim 1 wherein the interface includes a notch formed thereon facing the airbag to further lower the resistance threshold to pressure.

7. The vehicle interior panel of claim 6 wherein the interface further includes a groove formed thereon facing away from the airbag to further lower the resistance threshold to pressure.

8. The vehicle interior panel of claim 1 wherein the panel is free of any metal doors for opening the door covering the opening.

9. A vehicle interior panel having a seamless airbag door for covering an opening through which an airbag may deploy therethrough, the panel comprising:
    a retainer portion disposed adjacent the airbag, the retainer portion having an opening through which the airbag may deploy, the retainer portion having an appearance finish; and
    a door portion disposed within the opening integrally circumscribed by the retainer portion to cover the opening, the door portion having an appearance finish substantially similar to the appearance finish of the retainer portion such that no seam is visible; with
    the door portion being molded together with the retainer portion and formed of a material different than the material of the retainer portion, the retainer portion having a perimeter about which the door portion is circumscribed to form the door, the perimeter defining an interface between the door and retainer portions, the interface having a low resistance threshold to pressure such that the door and retainer portions separate when the airbag is deployed, and with the door portion extending away from the airbag and transverse the retainer portion defining a skin portion of the panel having an aesthetic appearance.

10. The vehicle interior panel of claim 9 further comprising a top portion disposed over the retainer and door portions.

11. The vehicle interior panel of claim 9 wherein the retainer portion is of a first material and the door portion is of a second material.

12. The vehicle interior panel of claim 11 wherein the first material is more rigid than the second material.

13. The vehicle interior panel of claim 9 wherein the interface defines the opening.

14. The vehicle interior panel of claim 9 wherein the interface includes a notch formed thereon facing the airbag to further lower the resistance threshold to pressure.

15. The vehicle interior panel of claim 14 wherein the interface includes a groove formed thereon facing away from the airbag to further lower the resistance threshold to pressure.

16. The vehicle interior panel of claim 9 wherein the panel is free of any metal doors for opening the door covering the opening.

* * * * *